United States Patent
Yokoyama et al.

(10) Patent No.: US 10,009,947 B2
(45) Date of Patent: Jun. 26, 2018

(54) WIRELESS COMMUNICATION TERMINAL, WIRELESS COMMUNICATION SYSTEM, AND STORAGE MEDIUM STORING WIRELESS COMMUNICATION PROGRAM

(71) Applicant: SEIKO EPSON CORPORATION, Tokyo (JP)

(72) Inventors: Daiki Yokoyama, Azumino (JP); Kenji Sakuda, Suwa (JP); Yohei Ogawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/399,013

(22) Filed: Jan. 5, 2017

(65) Prior Publication Data
US 2017/0202035 A1    Jul. 13, 2017

(30) Foreign Application Priority Data
Jan. 13, 2016    (JP) ................................ 2016-004170

(51) Int. Cl.
*H04B 7/00* (2006.01)
*H04W 76/10* (2018.01)
(Continued)

(52) U.S. Cl.
CPC ........ *H04W 76/10* (2018.02); *H04N 1/00315* (2013.01); *H04N 1/32776* (2013.01);
(Continued)

(58) Field of Classification Search
CPC ....... H04W 76/02; H04W 4/008; H04W 8/26; H04W 88/08; H04N 1/00315; H04N 1/32776; H04N 1/32789; H04N 2201/3207
See application file for complete search history.

(56) References Cited

U.S. PATENT DOCUMENTS

2009/0052348 A1    2/2009   Kato et al.
2014/0292496 A1    10/2014  Tredoux et al.
(Continued)

FOREIGN PATENT DOCUMENTS

| EP | 2963905 A2 | 1/2016 |
| JP | 2009-135865 A | 6/2009 |
| WO | 2014/189752 A1 | 11/2014 |

OTHER PUBLICATIONS

European Search Report for Application No. 17151385.6 dated Jun. 9, 2017.

*Primary Examiner* — Xin Jia
(74) *Attorney, Agent, or Firm* — Workman Nydegger

(57) ABSTRACT

A wireless communication terminal includes an identification information obtainment unit that obtains identification information using, for example, a short-range wireless communication with the wireless communication device, a connection determination unit that, when the identification information in the network is wirelessly transmitted to an external access point connected in advance and a response for the transmission of the identification information in the network is received, determines whether or not a wireless communication device corresponding to the identification information in the network is on the network through the external access point based on the received response, a connection selection unit that selects whether to wirelessly connect to the wireless communication device without going through the external access point or wirelessly connect to the wireless communication device through the external access point, in accordance with the determined result, and a communication control unit that performs wireless communication with the wireless communication device.

17 Claims, 5 Drawing Sheets

(51) Int. Cl.
*H04W 4/80* (2018.01)
*H04N 1/00* (2006.01)
*H04N 1/327* (2006.01)
*H04W 8/26* (2009.01)
*H04W 88/08* (2009.01)
*H04L 29/12* (2006.01)

(52) U.S. Cl.
CPC .......... *H04N 1/32789* (2013.01); *H04W 4/80* (2018.02); *H04W 8/26* (2013.01); *H04L 61/103* (2013.01); *H04L 61/6022* (2013.01); *H04N 2201/3207* (2013.01); *H04W 88/08* (2013.01)

(56) References Cited

U.S. PATENT DOCUMENTS

2015/0304805 A1* 10/2015 Suzuki .................. H04W 4/008 455/41.1
2015/0355875 A1* 12/2015 Matsushita ........... G06F 3/1236 358/1.15
2017/0134609 A1* 5/2017 Park .................. H04N 1/32776

* cited by examiner

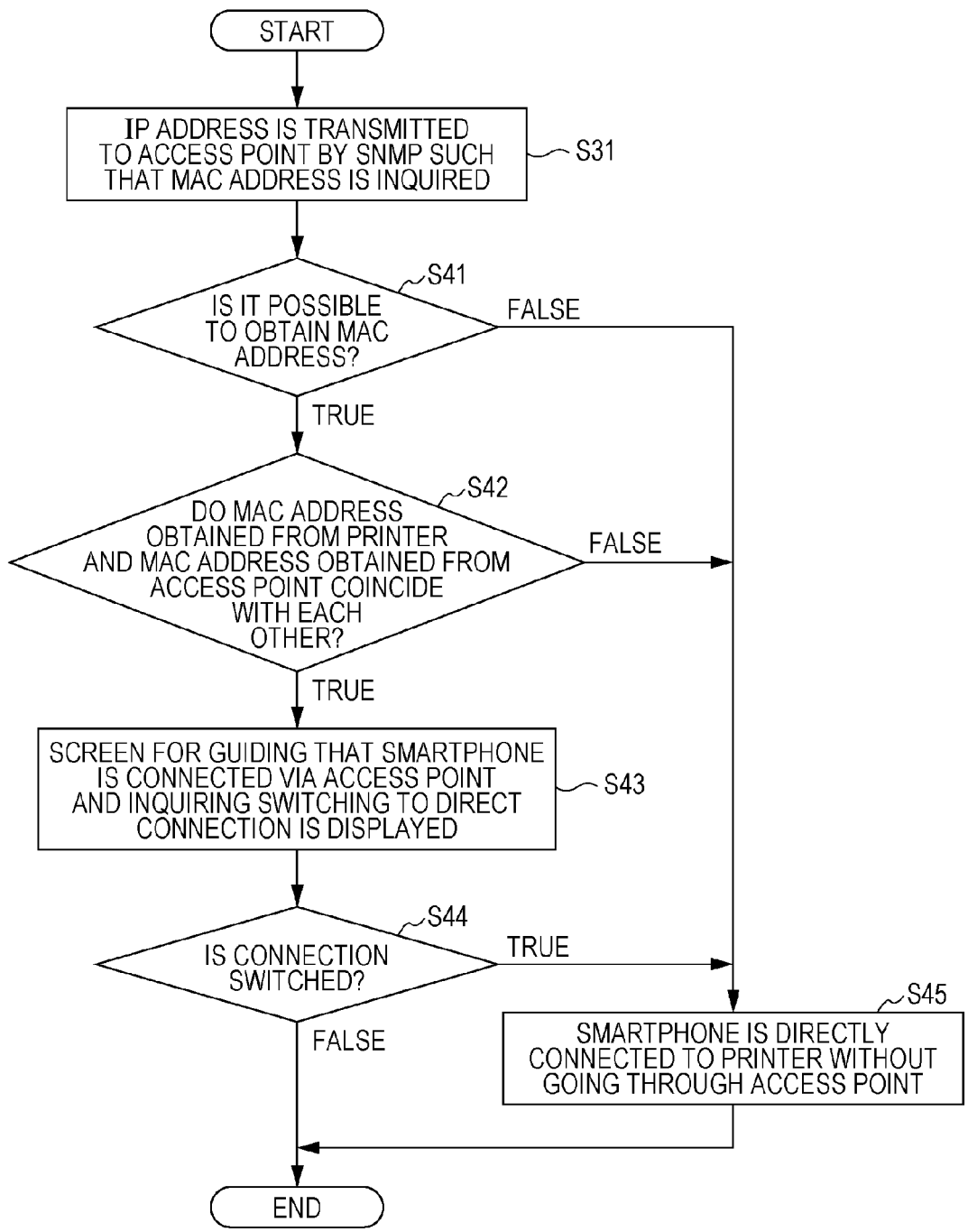

WIRELESS COMMUNICATION TERMINAL, WIRELESS COMMUNICATION SYSTEM, AND STORAGE MEDIUM STORING WIRELESS COMMUNICATION PROGRAM

CROSS REFERENCES TO RELATED APPLICATIONS

This application claims priority to Japanese Application No. 2016-004170, filed Jan. 13, 2016, the entirety of which is incorporated by reference herein.

BACKGROUND

1. Technical Field

The present invention relates to a wireless communication terminal, a wireless communication system, and a storage medium storing a wireless communication program.

2. Related Art

Recently, a short-range wireless communication technology such as near field radio communication (NFC) is popular. For example, short-range wireless communication with a low communication speed is used to obtain information for connecting a mobile communication terminal to a printer or the like through a wireless communication network such as a wireless LAN with a high communication speed.

JP-A-2009-135865 is an example of the related art.

However, in a state where a wireless communication device such as the printer is connected to the wireless communication network of an access point, when a portable wireless communication terminal is automatically and wirelessly connected to the wireless communication device without going through the access point using the short-range wireless communication with the wireless communication device as a trigger, even though the printer is connected to the wireless communication network, new wireless connection without going through the wireless communication device and the access point is established.

SUMMARY

An advantage of some aspects of the invention is to provide a technology which can appropriately perform wireless connection between a wireless communication terminal and a wireless communication device with the short-range wireless communication as a trigger.

(1) According to an aspect of the invention, there is provided a wireless communication terminal including: an identification information obtainment unit that obtains identification information in a network of a wireless communication device by short-range wireless communication with the wireless communication device; a connection determination unit that, when the identification information in the network is wirelessly transmitted to an external access point connected in advance and a response for the transmission of the identification information in the network is received, determines whether or not the wireless communication device corresponding to the identification information in the network is on the network through the external access point based on the received response; a connection selection unit that selects whether to wirelessly connect to the wireless communication device without going through the external access point or wirelessly connect to the wireless communication device through the external access point, in accordance with the determined result; and a communication control unit that performs wireless communication with the wireless communication device by the selected wireless connection.

According to the aspect of the invention, even in a case where the short-range wireless communication with the wireless communication device is made, since whether or not to wirelessly connect to the wireless communication device without going through the access point is selected after it is determined whether or not the wireless communication terminal can be wirelessly connected to the wireless communication device through the access point, it is possible to appropriately establish wireless connection with the wireless communication device without going through the access point.

(2) Even though an access point and a wireless communication terminal can be connected to each other, in a case where the wireless communication device is not connected to the access point, the portable wireless communication terminal cannot be wirelessly connected to the wireless communication device through the access point. Therefore, in the wireless communication terminal, the identification information obtainment unit may obtain a logical address and a first physical address of the wireless communication device as the identification information in the network by the short-range wireless communication, the connection determination unit may obtain a second physical address corresponding to the logical address by wireless communication through the external access point, check the first physical address and the second physical address, and determine that the wireless communication terminal can be wirelessly connected to the wireless communication device through the access point in a case where the first physical address and the second physical address coincide with each other, and the connection selection unit may be wirelessly connected to the wireless communication device without going through the external access point in a case where the wireless communication terminal cannot be wirelessly connected to the wireless communication device through the external access point.

By adopting this configuration, it is possible to exactly determine whether or not the wireless communication terminal can be connected to the wireless communication device through the access point.

(3) In the wireless communication terminal, the identification information obtainment unit may obtain the identification information in the network of the wireless communication device and network identification information of the wireless communication device, and the connection selection unit may be wirelessly connected to a network of the wireless communication device by using the network identification information without going through the external access point, in a case where the wireless communication terminal cannot be wirelessly connected to the wireless communication device through the external access point.

By adopting this configuration, it is possible for a user to easily connect the portable wireless communication terminal to the wireless communication device without going through the access point. Here, the network identification information of the wireless communication device includes an identification name as the access point (internal access point) of the wireless communication device.

(4 and 5) Even though a function for wirelessly connecting without going through the access point is provided in the wireless communication device, it is not guaranteed that the wireless communication terminal can be connected to the wireless communication device at any times without going through the access point. For example, typically, there is a limit to the number of the wireless communication terminals capable of wirelessly connecting with the wireless communication device without going through the access point. Therefore, in the wireless communication terminal, the connection determination unit may determine whether or not the wireless communication terminal can be wirelessly connected to the wireless communication device through the external access point, and whether or not the wireless communication terminal can be wirelessly connected to the wireless communication device without going through the external access point, and the connection selection unit may be wirelessly connected to the wireless communication device through the external access point, in a case where the wireless communication terminal can be wirelessly connected to the wireless communication device through the external access point, and the wireless communication terminal cannot be wirelessly connected to the wireless communication device without going through the external access point. In addition, furthermore, the connection determination unit may obtain connection state information indicating a wireless connection state of the wireless communication device without going through the external access point, and determine whether or not the wireless communication terminal can be wirelessly connected to the wireless communication device without going through the external access point based on the connection state information.

By adopting this configuration, since the wireless communication terminal is wirelessly connected to the wireless communication device without going through the access point, after it is determined whether or not the wireless communication terminal can be wirelessly connected to the wireless communication device without going through the access point, it is possible to reduce time loss required for wirelessly connecting with the wireless communication device without going through the access point.

(6) According to another aspect of the invention, there is provided a wireless communication system including a wireless communication terminal that includes an identification information obtainment unit that obtains identification information in a network of the wireless communication device by short-range wireless communication, a connection determination unit that wirelessly transmits the identification information in the network to an access point, and determines whether or not the wireless communication terminal can be wirelessly connected to the wireless communication device through the access point, and a connection selection unit that selects whether to wirelessly connect to the wireless communication device without going through the external access point or wirelessly connect to the wireless communication device through the external access point, in accordance with the determined result, and a wireless communication device that includes a response unit that responds to inquiry by a simple network management protocol (SNMP) from the access point, and a starting unit that starts the response unit in accordance with the short-range wireless communication.

According to the aspect of the invention, it is possible to reduce time loss required for wirelessly connecting with the wireless communication device without going through the access point. In addition, in the wireless communication device, it is possible to reduce standby electric power of the response unit that responds to the inquiry by the SNMP.

Functions of each unit according to the aspects are realized by a hardware resource of which functions are specified by configuration itself, a hardware resource of which functions are specified by programs, or by combinations thereof. In addition, functions of these units are not limited to functions realized by physically independent hardware resources. The invention can be applied as a wireless communication program or recording medium thereof. Of course, the recording medium may be a magnetic recording medium, a magneto-optical recording medium, or any recording medium to be developed in the future.

BRIEF DESCRIPTION OF THE DRAWINGS

The invention will be described with reference to the accompanying drawings, wherein like numbers reference like elements.

FIG. 5 is a flowchart of a connection determination process according to the embodiment of the invention.

DESCRIPTION OF EXEMPLARY EMBODIMENTS

Figure 1:
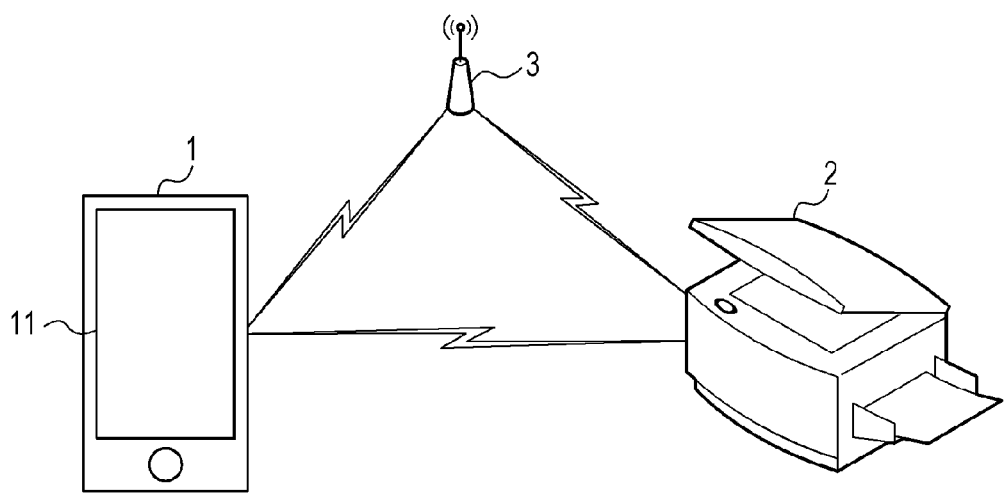
FIG. 1 is a network configuration diagram of a wireless communication system according to an embodiment of the invention.

Hereinafter, an embodiment of the invention will be described with reference to attached drawings. The same reference numerals are given to the corresponding constituent elements in the drawings, and overlapped descriptions will be omitted.

1. Configuration of Wireless Communication System

FIG. 1 illustrates a wireless communication system including a smartphone 1 as an embodiment of a wireless communication terminal, a printer 2 as an embodiment of a wireless communication device, and an access point 3. The access point 3 is a repeater that wirelessly connects external devices each other by a wireless LAN protocol (IEEE 802.11).

Figure 2:
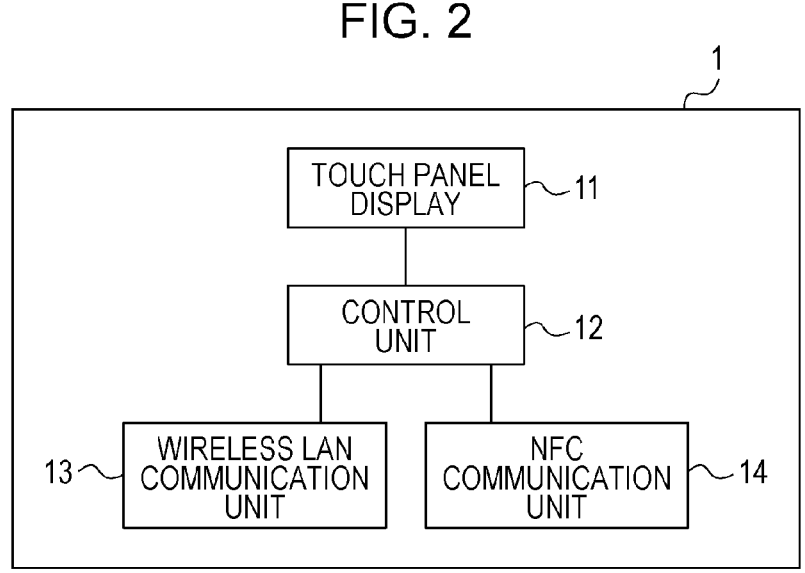
FIG. 2 is a block diagram of a smartphone according to the embodiment of the invention.

As illustrated in FIG. 2, the smartphone 1 as the wireless communication terminal includes a wireless LAN communication unit 13 that communicates with an external device by the wireless LAN protocol, an NFC communication unit 14 that communicates with an external device by an NFC protocol (ISO/IEC 18092), a control unit 12 that is configured by a computer, and a touch panel display 11. The control unit 12 includes a RAM that is a main storage device, a flash memory that is an external storage device, a processor, and an input and output mechanism. The control unit 12 executes a wireless communication program in a processor by loading the wireless communication program stored in the flash memory in the RAM such that the control unit 12 functions as an identification information obtainment unit, a connection determination unit, a connection selection unit, and a communication control unit.

Figure 3:
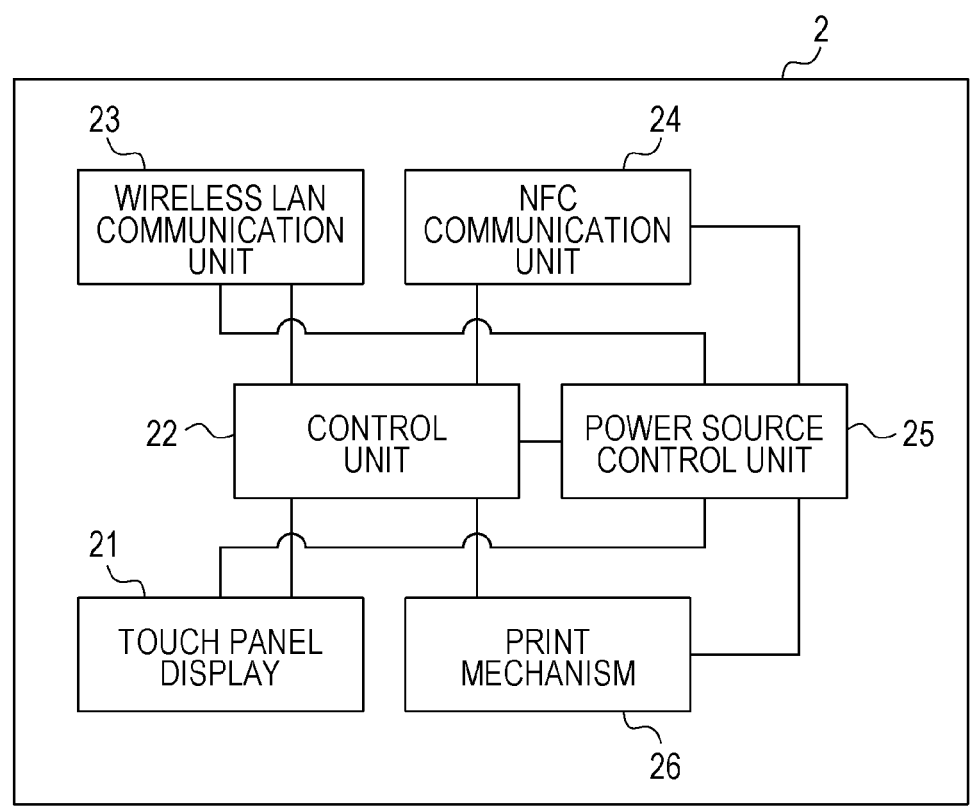
FIG. 3 is a block diagram of a printer according to the embodiment of the invention.

As illustrated in FIG. 3, the printer 2 as the wireless communication device includes a touch panel display 21, a control unit 22 configured by a computer, a wireless LAN communication unit 23 that communicates with an external device by the wireless LAN protocol, an NFC communication unit 24 that communicates with an external device according to the NFC protocol, a print mechanism 26 that performs printing on a print medium, and a power source control unit 25.

The control unit 22 includes the RAM that is a main storage device, the flash memory that is an external storage device, a processor, and an input and output mechanism, and functions as a response unit and a starting unit. The power source control unit 25 is a circuit that controls electric power to be supplied to the wireless LAN communication unit 23, the NFC communication unit 24, the control unit 22, the touch panel display 21, and the print mechanism 26, and functions as the starting unit.

The wireless LAN communication unit 23 has a function for wirelessly connecting to an external device through the access point 3, and a function for wirelessly connecting to the external device without going through the access point 3. The wireless LAN communication unit 23 functions as an access point (internal access point) of the external device, when wirelessly connecting to the external device without going through the access point 3. That is, the printer 2 can also be wirelessly connected to a communication terminal connected to a network in which the access point 3 is a parent in an infrastructure mode, and can also be wirelessly connected to another communication terminal in which itself is the parent in a peer-to-peer manner.

For example, the NFC communication unit 24 is an NFC tag configured to perform communication according to an NFC standard. Connection information of the printer 2 is recorded in the storage medium inside a tag of the NFC communication unit 24 by the control unit 22. The connection information includes an IP address (logical address) and a MAC address (first physical address) as network identification information of the printer 2, and a service set identifier (SSID) and a password as the network identification information of the printer 2. In addition, the storage medium inside the tag of the NFC communication unit 24 is configured to be recorded by the control unit 12, and when an IP address is allocated for the printer 2, the control unit 12 records the IP address in the storage medium inside the tag. In this embodiment, the NFC communication unit 24 is described as the NFC tag. However, the NFC communication unit 24 may be a reader or writer.

2. Operation of Wireless Communication System

Next, with reference to FIG. 4 to FIG. 6B, a wireless connection sequence according to the above-described wireless communication system will be described. A process of the wireless connection sequence illustrated in FIG. 4 starts by approaching the NFC communication unit 14 of the smartphone 1 on the NFC communication unit 24 of the printer 2 by a user.

When connection of NFC communication is established between the NFC communication units 14 and 24 by approaching the NFC communication unit 14 on the NFC communication unit 24 of the printer 2, the NFC communication unit 14 of the smartphone 1 reads the connection information from the NFC communication unit 24 of the printer 2 (S1). As described above, the connection information includes the IP address of the printer 2, the MAC address, and the service set identifier (SSID) and the password of the printer 2.

Here, in a case where the printer 2 is operated in a power saving mode when a user approaches the NFC communication unit 14 of the smartphone 1 on the NFC communication unit 24 of the printer 2 and an SNMP agent does not start, when the NFC communication unit 24 of the printer 2 communicates with the NFC communication unit 14 of the smartphone 1, the control unit 22 and the power source control unit 25 starts the SNMP agent (S2). Specifically, the control unit 22 changes an operating frequency by changing a mode, starts the SNMP agent, and then the power source control unit 25 supplies electric power in accordance with the changed mode to the control unit 22. By starting the SNMP agent, in a case where information of management information base (MIB) is requested from the access point 3 as an SNMP manager, the control unit 22 can respond to the request thereof. In this manner, since the SNMP agent starts when the NFC communication unit 24 of the printer 2 communicates with the NFC communication unit 14 of the smartphone 1, it is not necessary to start the SNMP agent until the NFC communication unit 24 of the printer 2 communicates with the NFC communication unit 14 of the smartphone 1. Accordingly, it is possible to reduce power consumption of the printer 2.

The smartphone 1 performs inquiry for the access point 3 when the connection information is read from the printer 2 (S3). However, the smartphone 1 selects whether the smartphone 1 is wirelessly connected to the printer 2 without going through the access point 3, or wirelessly connected to the printer 2 through the access point 3 based on a response that is received (S4). FIG. 5 is a flowchart illustrating processes of steps S3 and S4 in detail. Hereinafter, with reference to FIG. 4 and FIG. 5, a connection determination process will be described in detail.

When the smartphone 1 obtains the connection information from the printer 2 by the NFC communication, as illustrated in FIG. 5, the smartphone 1 inquires a MAC address (second physical address) of a device corresponding to an IP address obtained from the printer 2 on a wireless network of the access point 3 with respect to the access point 3 (S31). Specifically, the smartphone 1 may transmit an IP address included in the obtained connection information to the access point 3 by the SNMP.

Figure 4:
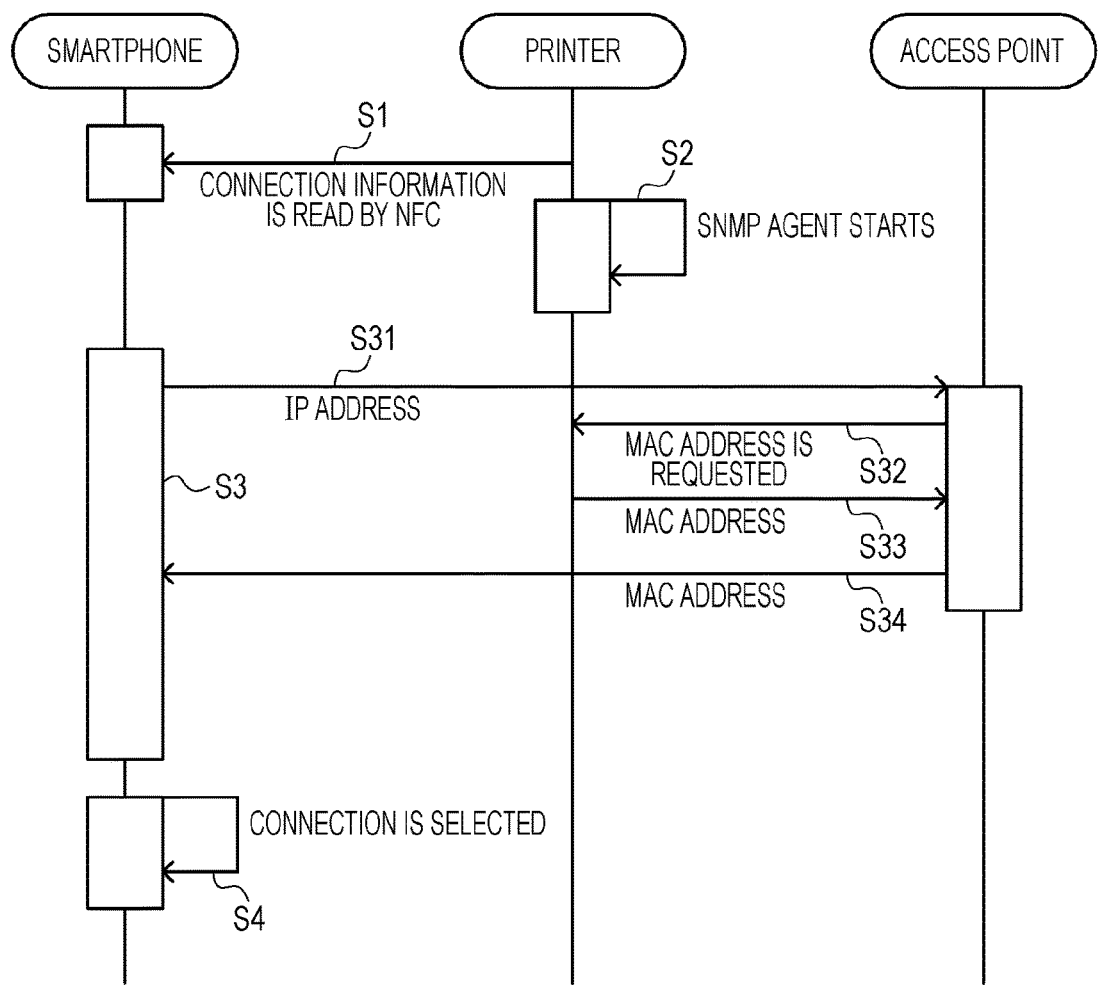
FIG. 4 is a sequence chart of a wireless connection sequence according to the embodiment of the invention.

When inquiry of the MAC address is received as well as the IP address from the smartphone 1, as illustrated in FIG. 4, the access point 3 inquires the MAC address corresponding to the IP address to a terminal that coincides with the IP address by the SNMP. At this time, if the printer 2 is wired or wirelessly connected to the access point 3, since the IP address obtained from the printer 2 and the IP address allocated in the printer 2 as the identification information within the network of the access point 3 coincide with each other, the smartphone 1 inquires the MAC address with respect to the printer 2 (S32). As a result, the access point 3 obtains the MAC address of the printer 2 (S33).

In addition, in a case where the printer 2 is not connected to a communication network of the access point 3 to which the smartphone 1 is wirelessly connected, when a device for which the same IP address as that of the printer 2 on the communication network is allocated exists, the smartphone 1 can obtain the MAC address of the device different from the printer 2. The access point 3 transmits the MAC address obtained as a response of the inquiry to the smartphone 1 (S34).

In a case where the printer 2 is not wired or wirelessly connected to the access point 3, since inquiry of the MAC address is not received to the printer 2, the access point 3 cannot obtain the MAC address of the printer 2.

When the response thereof is received after the smartphone 1 wirelessly transmits the IP address obtained from the printer 2 by the NFC communication to the access point 3 or when a predetermined time elapses after transmitting the IP address, the smartphone 1 determines whether or not the MAC address can be obtained (S41 to S45).

In a case where the MAC address cannot be obtained, since the printer 2 is not wired or is not wirelessly connected to the access point 3, the smartphone 1 is not directly connected to the printer 2 by the wireless LAN protocol without going through the access point 3 (S45). At this time, the control unit 12 of the smartphone 1 is connected to the internal access point of the printer 2 by the wireless LAN protocol by using the SSID and password of the printer 2 obtained from the printer 2 by the NFC such that a series of wireless connection sequences that trigger the NFC communication are terminated. When the smartphone 1 is directly connected to the printer 2 by the wireless LAN protocol without going through the access point 3, a message as illustrated in FIG. 6B may be displayed on the touch panel display 11.

In a case where the MAC address is obtained, the control unit 12 of the smartphone 1 determines whether or not the MAC address obtained from the printer 2 and the MAC address obtained from the access point 3 coincide with each other (S42). In a case where the printer 2 is connected to the access point 3, since the IP address of the printer 2 obtained from the printer 2 and the IP address of the printer 2 as the identification information in the network of the access point 3 coincide with each other, the MAC address obtained from the printer 2 and the MAC address obtained from the access point 3 coincide with each other.

However, as described above, even though the MAC address can be obtained from the access point 3, in a case where the printer 2 is not connected to the access point 3, a MAC address corresponding to an IP address of another communication terminal managed by the access point 3 is transmitted from the access point 3 to the smartphone 1. Therefore, the MAC address obtained from the printer 2 and the MAC address obtained from the access point 3 do not coincide with each other.

In a case where the MAC address obtained from the printer 2 and the MAC address obtained from the access point 3 do not coincide with each other, since the printer 2 is not wired or wirelessly connected to the access point 3, the smartphone 1 is directly connected to the printer 2 by the wireless LAN protocol without going through the access point 3 (S45), and a series of wireless connection sequences which trigger the NFC communication are terminated.

In a case where the MAC address obtained from the printer 2 and the MAC address obtained from the access point 3 coincide with each other, since the printer 2 is wired or wirelessly connected to the access point 3, the smartphone 1 can be wirelessly connected to the printer 2 through the access point 3 even though the smartphone 1 and the printer 2 are directly not connected to each other. Then, the control unit 12 of the smartphone 1 displays a screen for guiding that the smartphone 1 is connected via the access point and inquiring to users whether or not the smartphone 1 is switched to direct connection, on the touch panel display 11 (S43).

Figure 6A:
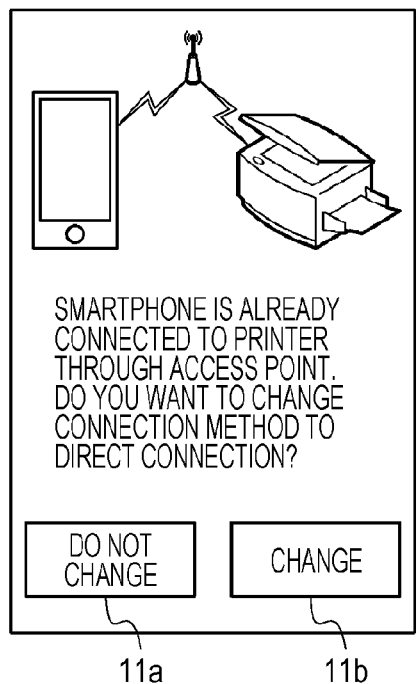
FIGS. 6A and 6B are screen configuration diagrams according to the embodiment of the invention.
Figure 6B:
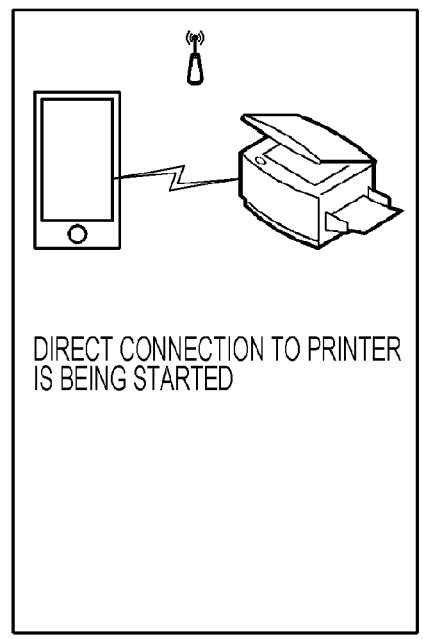

A configuration example of this screen is illustrated in FIG. 6A. The control unit 12 of the smartphone 1 detects whether an icon 11*a* is selected or an icon 11*b* is selected, and determines whether or not the smartphone 1 is switched to the direct connection in accordance with the detected result (S44).

When a user performs selection for switching the connection by operating the touch panel display 11, the control unit 12 of the smartphone 1 is directly connected to the printer 2 by the wireless LAN protocol without going through the access point 3 (S45), and a series of wireless connection sequences which trigger the NFC communication are terminated.

When the user performs selection for not switching the connection by operating the touch panel display 11, the control unit 12 of the smartphone 1 terminates a series of wireless connection sequences which trigger the NFC communication without performing the switching of the connection.

In a state where a wireless connection process is terminated, the smartphone 1 and the printer 2 can be wirelessly communicated with each other, via the access point 3, or directly without going through the access point 3.

3. Another Embodiment

The technical scope of the invention is not limited to the above-mentioned embodiments, and it goes without saying that various modifications can be made without departing from the gist of the invention. For example, in the embodiment, by using the IP address as the identification information in the network of the printer, a MAC address of a device corresponding to the IP address thereof is inquired by using the SNMP. However, the MAC address as the identification information in the network of the printer is transmitted to the access point such that whether or not a communication device of the MAC address is connected to the access point may be inquired.

In addition, in the embodiment, after it is determined that the printer and the smartphone can be wirelessly connected to each other through the access point, whether or not the printer and the smartphone are directly and wirelessly connected to each other without going through the access point is inquired to a user. However, in a case where the printer and the smartphone can be wirelessly connected to each other through the access point, wireless connection through the access point may be performed without performing selection for directly and wirelessly connecting the printer and the smartphone by inquiring to the user. In this way, it is possible to wirelessly connect the printer and the smartphone by a simple operation, without changing a wireless connection state set in the smartphone in advance. For example, even in the smartphone configured to exclusively perform the wireless connection through the access point and direct wireless connection, the wireless connection through the access point is switched to the direct wireless connection by triggering the NFC communication such that the wireless connection through the access point is disconnected, and wireless communication with another device connected to this network can be performed.

In addition, a protocol of the short-range wireless communication may be ISO/IEC 14443, ISO/IEC 15693, ISO/IEC 21481, or the like. In addition, the wireless communication device is not limited to the printer, may be provided with a short-range wireless communication function and a communication function through the access point, may be as a scanner, may be as a projector, may be as a camera, and may be as another smart device. In addition, as a communication function other than the short-range wireless communication in the wireless communication device, the wireless communication device may be communicated with the access point, and may be connected to the access point through a wired network. In addition, a portable wireless communication terminal is also not limited to the smartphone, may be provided with the short-range wireless communication function and the communication function through the access point, and may be as a tablet terminal.

In addition, in the embodiment, in a case where the printer and the smartphone cannot be wirelessly connected to each other through the access point, a process by which the smartphone is directly and wirelessly connected to the printer without going through the access point is performed. However, in a case where it is determined whether or not the portable wireless communication terminal and the wireless communication device can be wirelessly connected to each other without going through the access point such that the portable wireless communication terminal and the wireless communication device cannot be wirelessly connected to each other without going through the access point, the process by which the portable wireless communication terminal is directly and wirelessly connected to the wireless communication device without going through the access point, may not be performed.

Specifically, for example, it is as follows. When the smartphone 1 obtains the connection information from the printer 2 by the NFC, connection state information indicating the wireless connection state of the printer 2 without going through the access point 3, that is, a state in which the wireless communication terminal is directly and wirelessly connected to the printer 2 as the access point, is obtained as well as the connection information. It is possible to use additional possibility of the direct wireless connection, the number of terminals that are directly and wirelessly connected, the number of terminals capable of additionally performing the direct wireless connection, or the like as the connection state information. Then, the smartphone 1 determines whether or not the smartphone 1 can be directly and wirelessly connected to the printer 2, based on the connection state information. In a case where the smartphone 1 cannot be directly and wirelessly connected to the printer 2, the smartphone 1 is not directly connected to the printer 2 by the wireless LAN protocol without going through the access point 3 such that a series of the wireless connection processes that trigger the NFC communication may be terminated. In a case where the smartphone 1 can be directly and wirelessly connected to the printer 2, the above-described steps from S31 to S41 may be performed.

What is claimed is:

1. A wireless communication terminal comprising:
    an identification information obtainment unit that obtains identification information in a network of a wireless communication device by short-range wireless communication with the wireless communication device, the identification information including a logical address of the wireless communication device and first physical address of the wireless communication device;
    a connection determination unit that wirelessly transmits the logical address to an external access point connected to the network to which the wireless communication terminal is connected and receives a response from the external access point that includes a second physical address from the external access point that associated with the logical address in the network, wherein the connection determination unit determines whether or not the wireless communication device corresponding to the identification information in the network is on the network through the external access point based on the received response by comparing the first physical address and the second physical address;
    a connection selection unit that selects whether to wirelessly connect to the wireless communication device without going through the external access point or wirelessly connect to the wireless communication device through the external access point, in accordance with the determined result; and
    a communication control unit that performs wireless communication with the wireless communication device by the selected wireless connection.

2. The wireless communication terminal according to claim 1,
    wherein the connection determination unit obtains the second physical address corresponding to the logical address by the wireless communication through the external access point, checks the first physical address and the second physical address, and determines that the wireless communication terminal can be wirelessly connected to the wireless communication device through the access point in a case where the first physical address and the second physical address coincide with each other, and
    wherein the connection selection unit is wirelessly connected to the wireless communication device without going through the external access point in a case where the wireless communication terminal cannot be wirelessly connected to the wireless communication device through the external access point.

3. The wireless communication terminal according to claim 1,
    wherein the identification information obtainment unit obtains the identification information in the network of the wireless communication device and network identification information of the wireless communication device, and
    wherein the connection selection unit is wirelessly connected to a network of the wireless communication device by using the network identification information without going through the external access point, in a case where the wireless communication terminal cannot be wirelessly connected to the wireless communication device through the external access point.

4. The wireless communication terminal according to claim 1,
    wherein the connection determination unit determines whether or not the wireless communication terminal can be wirelessly connected to the wireless communication device through the external access point, and whether or not the wireless communication terminal can be wirelessly connected to the wireless communication device without going through the external access point, and
    wherein the connection selection unit is wirelessly connected to the wireless communication device through the external access point, in a case where the wireless communication terminal can be wirelessly connected to the wireless communication device through the external access point, and the wireless communication terminal cannot be wirelessly connected to the wireless communication device without going through the external access point.

5. The wireless communication terminal according to claim 4,
    wherein the connection determination unit obtains connection state information indicating a wireless connection state of the wireless communication device without going through the external access point, and determines whether or not the wireless communication terminal can be wirelessly connected to the wireless communication device without going through the external access point based on the connection state information.

6. The wireless communication terminal according to claim 1, wherein the logical address is an IP address and the first physical address is a MAC (Media Access Control) address.

7. A wireless communication system that performs wireless communication between a wireless communication terminal and a wireless communication device,
   wherein the wireless communication terminal includes
   an identification information obtainment unit that obtains identification information in a network of the wireless communication device by short-range wireless communication with the wireless communication device, the identification information including a logical address of the wireless communication device;
   a connection determination unit that wirelessly transmits the logical address to an external access point connected to the network to which the wireless communication terminal is connected and receives a response from the external access point that includes a second physical address from the external access point that associated with the logical address in the network, wherein the connection determination unit, determines whether or not the wireless communication device corresponding to the identification information in the network is on the network through the external access point, based on the received response by comparing the first physical address and the second physical address;
   a connection selection unit that selects whether to wirelessly connect to the wireless communication device without going through the external access point or wirelessly connect to the wireless communication device through the external access point, in accordance with the determined result, and
   a communication control unit that performs the wireless communication with the wireless communication device by the selected wireless connection.

8. The wireless communication system according to claim 7,
   wherein the wireless communication device includes
   a response unit that responds to inquiry from the access point, and
   a starting unit that starts the response unit in accordance with the short-range wireless communication.

9. A computer readable storage medium storing a wireless communication program causing a computer to function as:
   an identification information obtainment unit that obtains identification information in a network of a wireless communication device by short-range wireless communication with the wireless communication device, the identification information including a logical address of the wireless communication device and first physical address of the wireless communication device;
   a connection determination unit that wirelessly transmits the logical address to an external access point connected to the network to which the wireless communication terminal is connected and receives a response from the external access point that includes a second physical address from the external access point that associated with the logical address in the network, wherein the connection determination unit determines whether or not the wireless communication device corresponding to the identification information in the network is on the network through the external access point based on the received response by comparing the first physical address and the second physical address;
   a connection selection unit that selects whether to wirelessly connect to the wireless communication device without going through the external access point or wirelessly connect to the wireless communication device through the external access point, in accordance with the determined result; and
   a communication control unit that performs wireless communication with the wireless communication device by the selected wireless connection.

10. A wireless communication terminal comprising:
    an identification information obtainment unit that obtains identification information in a network of a wireless communication device from the wireless communication device, the identification information including a logical address of the wireless communication device and first physical address of the wireless communication device;
    a connection determination unit that wirelessly transmits the logical address to an external access point connected to the network to which the wireless communication terminal is connected and receives a response from the external access point that includes a second physical address that is associated with the logical address in the network, wherein the connection determination unit determines whether or not the wireless communication device corresponding to the identification information in the network is on the network through the external access point based on the received response by comparing the first physical address and the second physical address;
    a connection selection unit that selects whether to wirelessly connect to the wireless communication device without going through the external access point or wirelessly connect to the wireless communication device through the external access point, in accordance with the determined result; and
    a communication control unit that performs wireless communication with the wireless communication device by the selected wireless connection.

11. The wireless communication terminal according to claim 10,
    wherein the connection determination unit obtains the second physical address corresponding to the logical address by the wireless communication through the external access point, checks the first physical address and the second physical address, and determines that the wireless communication terminal can be wirelessly connected to the wireless communication device through the access point in a case where the first physical address and the second physical address coincide with each other, and
    wherein the connection selection unit is wirelessly connected to the wireless communication device without going through the external access point in a case where the wireless communication terminal cannot be wirelessly connected to the wireless communication device through the external access point.

12. The wireless communication terminal according to claim 10,
    wherein the identification information obtainment unit obtains the identification information in the network of the wireless communication device and network identification information of the wireless communication device, and
    wherein the connection selection unit is wirelessly connected to a network of the wireless communication device by using the network identification information without going through the external access point, in a case where the wireless communication terminal cannot be wirelessly connected to the wireless communication device through the external access point.

13. The wireless communication terminal according to claim 10,
wherein the connection determination unit determines whether or not the wireless communication terminal can be wirelessly connected to the wireless communication device through the external access point, and whether or not the wireless communication terminal can be wirelessly connected to the wireless communication device without going through the external access point, and
wherein the connection selection unit is wirelessly connected to the wireless communication device through the external access point, in a case where the wireless communication terminal can be wirelessly connected to the wireless communication device through the external access point, and the wireless communication terminal cannot be wirelessly connected to the wireless communication device without going through the external access point.

14. The wireless communication terminal according to claim 13,
wherein the connection determination unit obtains connection state information indicating a wireless connection state of the wireless communication device without going through the external access point, and determines whether or not the wireless communication terminal can be wirelessly connected to the wireless communication device without going through the external access point based on the connection state information.

15. The wireless communication terminal according to claim 10, wherein the logical address is an IP address and the first physical address is a MAC (Media Access Control) address.

16. The wireless communication terminal according to claim 10, wherein the logical address is an IP address and the first physical address is a MAC (Media Access Control) address.

17. The wireless communication terminal according to claim 10, wherein the wireless communication device is a printer.

* * * * *